Feb. 17, 1925.
O. F. OGREN
1,527,005
GLASS ORNAMENTATION
Filed March 22, 1924
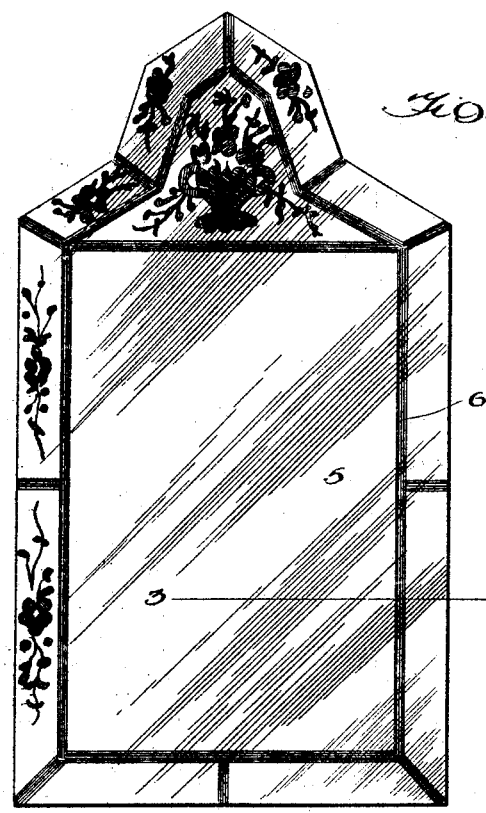
Fig. 1.
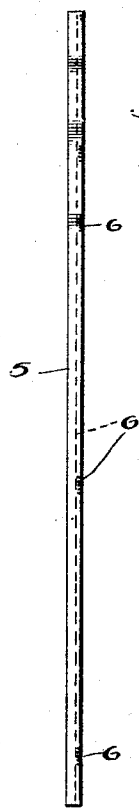
Fig. 2.
Fig. 3.
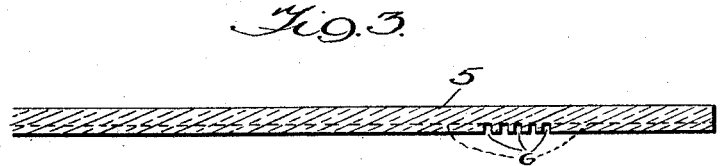
Fig. 4.
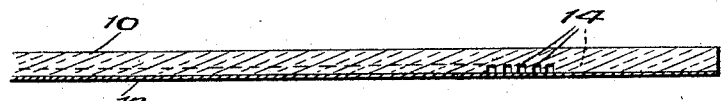
WITNESSES
Ethel Callan
INVENTOR
O. Frederick Ogren
BY Milo B. Stevens
ATTORNEYS Patented Feb. 17, 1925.

1,527,005

UNITED STATES PATENT OFFICE.

OSCAR FREDRICK OGREN, OF CHICAGO, ILLINOIS.

GLASS ORNAMENTATION.

Application filed March 22, 1924. Serial No. 701,183.

*To all whom it may concern:*

Be it known that I, OSCAR FREDRICK OGREN, a subject of the King of Sweden, residing at Chicago, in the county of Cook and State of Illinois, have invented new and useful Improvements in Glass Ornamentation, of which the following is a specification.

This invention relates to a means for decorating plate glass, mirrors and other sheet glass.

An important object of this invention is to provide a novel means for forming a border of small parallel gray lines on a mirror, plate glass or sheet glass and more particularly on the reverse side of the same whereby the outer surface of the glass or mirror is perfectly smooth and unbroken.

Other objects and advantages will be apparent during the course of the following description.

Figure 1 is an elevation of a piece of glass provided with the improved border;

Fig. 2 is an edge elevation of the same;

Fig. 3 is a horizontal sectional view taken on line 3—3 of Fig. 1;

Fig. 4 is a detailed sectional view taken through a mirror provided with the improved border.

In the drawing, the numeral 5 designates a glass body which may be provided with a border consisting of a plurality of slightly spaced parallel lines 6 which may extend in any desired direction and which are formed on the reverse or inner side of the glass. Also the walls of the grooves or lines 6 are allowed to remain unpolished so that the several lines when grouped as illustrated in Fig. 1 will appear to be practically a solid gray border.

Fig. 3 also illustrates that the side walls of the grooves or lines 6 are at right angles to the plane of the glass and this causes the several lines when arranged in parallel relation as illustrated in Fig. 1 to appear as one solid border line.

The inventive idea involved in this application may be carried out in connection with a piece of glass of any character or form to give the effect of a frame. The border can be curved to follow any shape of plate and can be applied to squares, circles, ovals, triangulars or any shape desired. The border can also vary in width from one-sixteenth of an inch to four inches according to the size of plate.

The border if desired, may be broken with floral decorations and designs in corners or in any other place, or two borders may be used with space between them for engravings or etching.

All the lines in the border are cut at one stroke and will run absolutely true and uniform. They are very sharp and will not wear off by polishing, the lines will as previously stated run so close together that the whole border is in a gray finish, or they may be arranged with a substantial space between them to let the silver or gilting show through.

The inventive idea involved may be carried out in connection with a mirror 10 having a silvered or mirrored back 12 which may if desired extend over the grooves 14. This will keep the grooves free from dust and make the surface easy to clean whereby it will have considerable advantage over mitered or beveled mirrors or deep glass ornamentations.

With reference to the foregoing description taken in connection with the accompanying drawing it will be seen that the border may be applied to either plate glass, sheet glass or a mirror in any desired shape or form and when applied will appear in a more or less uniform made finish. The outer side of the glass will remain smooth and unbroken.

Having thus described the invention, what is claimed is:

A glass body having a plurality of spaced parallel grooves in the reverse side thereof, both of the side walls of each groove being at right angles to the plane of the glass and the bottom walls of the grooves being parallel to the plane of the glass, all of the surfaces of the walls of the grooves being unfinished and remaining in a roughened state to present a gray border.

In testimony whereof I affix my signature.

O. FREDRICK OGREN.